(12) United States Patent
Persson et al.

(10) Patent No.: US 11,914,272 B2
(45) Date of Patent: Feb. 27, 2024

(54) DEVICE CONFIGURED FOR MOUNTING TO A SURFACE

(71) Applicant: Axis AB, Lund (SE)

(72) Inventors: Mikael Persson, Lund (SE); Johan Widerdal, Lund (SE); Johan Dittlén, Lund (SE); Leigh Collins, Lund (SE); Ulf Lundberg, Lund (SE)

(73) Assignee: AXIS AB, Lund (SE)

( * ) Notice: Subject to any disclaimer, the term of this patent is extended or adjusted under 35 U.S.C. 154(b) by 48 days.

(21) Appl. No.: 17/522,575

(22) Filed: Nov. 9, 2021

(65) Prior Publication Data

US 2022/0187690 A1   Jun. 16, 2022

(30) Foreign Application Priority Data

Dec. 11, 2020 (EP) .................................. 20213501

(51) Int. Cl.
*G03B 17/56*     (2021.01)
*F16M 13/02*    (2006.01)

(52) U.S. Cl.
CPC ........... *G03B 17/561* (2013.01); *F16M 13/02* (2013.01); *F16M 13/027* (2013.01)

(58) Field of Classification Search
CPC ........... F16B 21/09; F16B 21/12; F16B 21/16
See application file for complete search history.

(56) References Cited

U.S. PATENT DOCUMENTS

| | | | |
|---|---|---|---|
| 2,810,600 A | 10/1957 | Kendrick | |
| 4,369,340 A | 1/1983 | Beatenbough | |
| 5,689,304 A | 11/1997 | Jones et al. | |
| 6,309,183 B1 * | 10/2001 | Bucher | F04D 25/088 416/207 |
| 2017/0168376 A1 | 6/2017 | Adervall et al. | |

FOREIGN PATENT DOCUMENTS

| | | | |
|---|---|---|---|
| FR | 2452022 A1 | | 10/1980 |
| JP | 2007-009910 A | | 1/2007 |
| KR | 19990014418 U | * | 5/1999 |
| KR | 200440303 Y1 | | 6/2008 |
| WO | 2007/081099 A1 | | 7/2007 |

* cited by examiner

*Primary Examiner* — Noam Reisner
(74) *Attorney, Agent, or Firm* — Volpe Koenig

(57) ABSTRACT

A device configured for mounting to a surface, comprises a base part and an attachment part, the attachment part being attachable to the base part, wherein the base part is provided with a keyhole-shaped opening for receiving a fastener comprising a head and a shaft for attaching the base part to the surface, the keyhole-shaped opening comprises a first segment permitting passage of the head and shaft and a second segment permitting passage of the shaft but preventing passage of the head.

11 Claims, 4 Drawing Sheets

DEVICE CONFIGURED FOR MOUNTING TO A SURFACE

FIELD OF THE INVENTION

The present invention relates to improvements in safety for securing devices such as a camera to a wall and/or to a ceiling, more specifically to a device configured for mounting to a surface.

TECHNICAL BACKGROUND

Camera devices which are intended for surveillance and for monitoring of different environments are becoming more and more common. An example of such a camera device is a dome camera, which comprises a semi-spherical camera housing for allowing camera movements in relation to a base which in turn is attached to a support such as a wall or a ceiling. Such a camera allows rotation and tiling in many directions and thus achieves a large field of view. The entire housing may be rotated with the camera following the movements of the housing, or by rotating/tilting a camera mounted inside of the housing while the housing itself is stationary.

To achieve a good vantage point for the camera device and an undisturbed view of its surroundings, the device should preferably be mounted at an elevated position in relation to the environment that it is intended to monitor, such as high on a wall or in the ceiling. This generates strict requirements on the reliability of how the camera device is to be mounted to the wall/ceiling. This can in some applications be complicated by that many camera devices are provided with hidden fasteners for attaching it to the wall/ceiling, which may be desirable for an aesthetic perspective and/or for reducing the risk of unauthorized removal/tampering with the camera device. However, hidden fasteners may make it more difficult to control and ensure that the camera device is safely secured.

Manufacturers of camera devices thus constantly strive to provide safer products while facilitating installation thereof. Related background art can be found in U.S. Pat. No. 4,369,340 A.

SUMMARY

In view of that stated above, providing a device, preferably a camera device, that improves on prior art solution and mitigates at least some of the problems mention above would be beneficial.

An improved device has the features defined in claim 1.

More specifically, there is provided according to the present claims a device configured for mounting to a surface. The device comprises a base part and an attachment part, the attachment part is attachable to the base part. The base part is provided with a keyhole-shaped opening for receiving a fastener comprising a head and a shaft for attaching the base part to the surface, the keyhole-shaped opening comprises a first segment permitting passage of the head and shaft and a second segment permitting passage of the shaft but preventing passage of the head. The attachment part comprises a protrusion which in an assembled state of the base part and the attachment part restricts relative movement between the fastener and the base part. The attachment part is attachable to the base part by linear relative movement between the attachment part and the base part and the attachment part comprises an additional protrusion configured to be received by an additional opening provided in the base part in the assembled state.

The risk of the device unintentionally detaching from the fastener is thus reduced, as the assembly of the attachment part and the base part itself provides additional security in preventing relative movement between the fastener and the base part.

The additional protrusion of the attachment part configured to be received by the additional opening of the base part in the assembled state may facilitate correct relative orientation of the base part and attachment part.

The base part is a may be a camera base part and the attachment part may be a dome window.

The keyhole-shaped opening and the protrusion may further be peripherally arranged on the base part and the attachment part respectively. The peripheral arrangement of the keyhole-shaped openings reduces the risk of any rotational force applied to the exterior of the device becoming multiplied as could be the result if the keyhole-shaped openings were arranged closer to the center of the device. The risk of unintentional detachment of the device is thus reduced.

The attachment part may be attachable to the base part by rotational relative movement between the attachment part and the base part.

The protrusion may in the assembled state of the attachment part and the base part extend into the keyhole-shaped opening. The protrusion being arranged in the keyhole-shaped opening will reduce the risk of the base part moving in relation to the fastener in the assembled state of the device. Moreover, the protrusion may function as a guide for facilitating assembly of the attachment part and the base part by its interaction with the keyhole-shaped opening.

The base part may comprise a plurality of keyhole-shaped openings.

The attachment part may further comprise a plurality of protrusions.

The keyhole-shaped openings may be circumferentially distributed on the base part.

The attachment part may comprise an outer annular bottom section, an inner annular bottom section and a bridging section connecting the outer annular bottom section and the inner annular bottom section, the bridging section comprising a distal end forming the protrusion. The bridging section thus provides structural rigidity to the inner and outer annular sections. The protrusion will likewise be sufficiently rigid by being formed as a distal end of the bridging section between the outer and inner annular bottom sections, whereby the risk of the protrusion being damaged or compromised by interaction with the fastener is reduced.

The attachment part may further be releasably attached to the base part.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages will be better understood through the following illustrative and non-limiting detailed description of preferred embodiments, with reference to the appended drawings, where the same reference numerals will be used for similar elements, wherein.

DETAILED DESCRIPTION

The present teachings will now be set forth more fully hereinafter with reference to the accompanying drawings, in which currently preferred embodiments of the invention are shown. The teachings may, however, be embodied in many different forms and should not be construed as limited to the embodiments set forth herein; rather, these embodiments are provided for thoroughness and completeness, and fully convey the scope of the claims to the skilled person.

Figure 1:
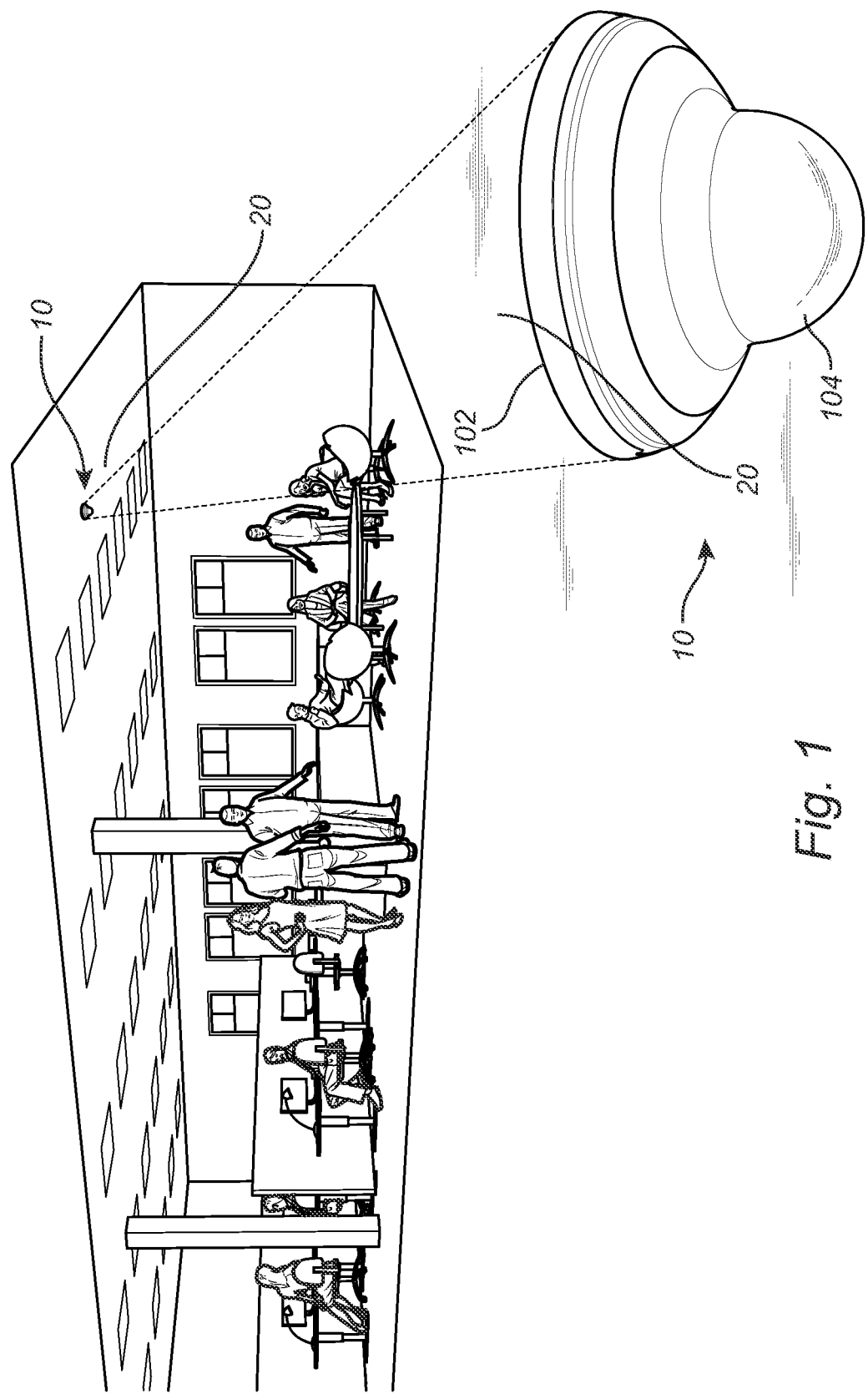
FIG. 1 discloses perspective view of a device attached to surface in the shape of a ceiling in an office environment.

FIG. 1 discloses a perspective view of a device 10, preferably a camera device 10, which is mounted to a surface 20. The camera device 10 is illustrated as a dome camera but may be embodied as another type of camera suitable for mounting to a surface 20.

The surface 20 may be any type of surface that is suited for attachment of the camera device 10, such as a wall or a ceiling. Typically, in case the device 10 is a camera device, the device 10 is preferably mounted at an elevated position in relation to its surroundings for achieving a desired field of view as illustrated in FIG. 1. This obviously necessitates that the device 10 is securely attached to the surface 20.

The device 10 comprises a base part 102 and an attachment part 104. The attachment part 104 is attachable to the base part 102, while the base part 102 configured to be attached to the surface 20. The base part 102 thus carries the weight of the attachment part 104 and forms a load bearing component of the device 10. The provision of the base part 102 facilitates mounting of the device 10 to the surface 20 as it may be secured by means of suitable fasteners 30 (shown in FIGS. 3 to 5) before the attachment part 104 is attached thereto. For instance, a camera unit (not shown) may be attached to the base part 102 while the attachment part 104 forms a cover/housing such as a dome window which encloses the camera unit inside of the device 10. The attachment part 104 may thus be partially or entirely transparent such that a camera unit arranged inside of the attachment part 104 can achieve a satisfactory image quality. The base part 102 and the attachment part 104 are shown being provided with corresponding circular shapes, but is to be realized that the base part 102 and/or the attachment part 104 could be provided with other shapes as well such as rectangular or hexagonal etc.

Figure 2:
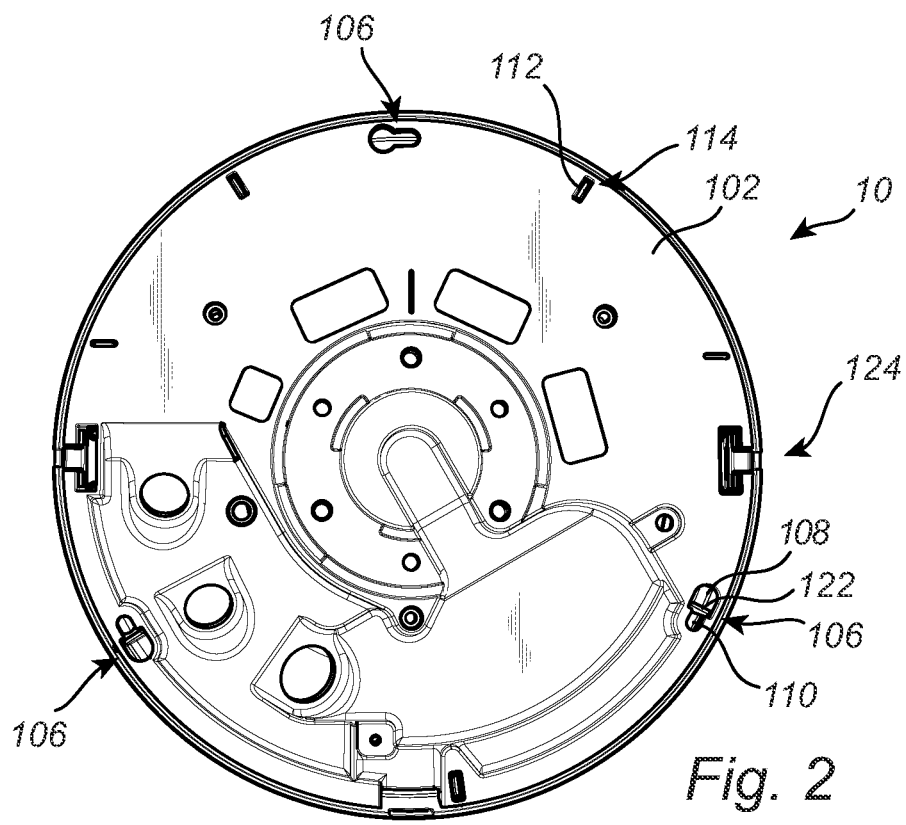
FIG. 2 discloses a posterior view of a device comprising a base part and an attachment part.

FIG. 2 shows the device 10 from a posterior view in which the base part 102 is shown from the side intended to be facing the surface 20. The base part 102 may be formed from a plastic material or e.g., from a metallic material. The base part 102 is provided with a keyhole-shaped opening 106 for receiving a fastener 30 (shown in FIG. 3) for attaching the base part 102 to the surface 20. The keyhole-shaped opening 106 facilitates attachment and removal of the base part 102 to/from the surface 20, as the fasteners 30 only needs to be loosened, and not being completely removed, for removal of the base part 102.

Preferably are a plurality of keyhole-shaped openings 106 provided such as three or more. The keyhole-shaped openings 106 are preferably arranged peripherally at the base part 102, i.e., near the perimeter thereof. The keyhole-shaped openings 106 may be evenly angularly distributed around the periphery of the base part 102. The keyhole-shaped openings 106 may further be unevenly distributed around the periphery of the base part 102, providing only one possible relative orientation of the base part 102 and the fasteners 30 as well as one possible relative orientation of the attachment part 104 and the base part 102 for allowing assembly of the two parts 102, 104.

Each keyhole-shaped opening 106 comprises a first segment 108 permitting passage of a head 32 (shown in FIG. 3) of the fastener 30, thus allowing the base part 102 to be removed from the surface 20 without completely removing the fastener 30. A second segment 110 of each keyhole-shaped opening 106 permits passage of a shaft 34 of the fastener 30 but prevents passage of the head 32 thereof. The base part 102 is for securing the base part 102 to the surface 20 configured to be adjusted in relation to the fastener 30 such that the fastener 30 is arranged in the second segment 110.

In order to reduce the risk of the base part 102, and thus the entire device 10, unintentionally detaching from the fasteners 30, the attachment part 104 is provided with a protrusion 122. The protrusion 122 is configured to, in an assembled state of the base part 102 and the attachment part 104, restrict relative movement between the fastener 30 and the base part 102. As is visible from FIGS. 2 and 3, this may be achieved as the protrusion 122 is configured to be arranged in the proximity of the head 32 of the fastener 30 when the attachment part 104 is attached to the base part 102 such that the head 32 cannot pass through the first segment 108.

The protrusion 122 may extend such that it is arranged in the first segment 108 of the keyhole-shaped opening 106 when the attachment part 104 is attached to the base part 102, thus preventing the fastener 30 to move in relation to the base part 102 from the second segment 110 to the first segment 108. Preferably one protrusion 122 is provided for each keyhole-shaped opening 106. It is however also feasible that less protrusions 122 are provided than keyhole-shaped openings 106.

The protrusion 122 may further extend such that it is arranged in the proximity of the keyhole-shaped opening 106 when the attachment part 104 is attached to the base part 102. In the proximity in this context means closer to the base part 102 than the height of the head 32 of the fastener 30, such that the movement of the fastener 30 in relation to the base part 102 will be obstructed by the protrusion 122. The protrusion 122 may thus not necessarily extend into the keyhole-shaped opening 106 but to a position above it which is sufficiently close to avoid the head 32 of the fastener 30 between the protrusion 122 and the base part 102. The protrusion 122 will thus be arranged such that it prevents the fastener 30 to move in relation to the base part 102 from the second segment 110 to the first segment 108 when the attachment part 104 is attached to the base part 102.

The base part 102 may further be provided with an additional opening 114 for receiving an additional protrusion 112 on the attachment part 104. A plurality of additional protrusions 112 and corresponding additional openings 112 may be provided, as illustrated in FIG. 2. The additional protrusions 112 and the corresponding additional openings 112 are preferably arranged peripherally at the attachment part 104 and the base part 102 respectively, i.e., near the perimeter of each respective part 102, 104. The additional protrusions 112 and the corresponding additional openings 112 are configured to facilitate correct orientation of the attachment part 104 when attached to the base part 102. The additional protrusions 112 and the corresponding additional openings 114 may thus be arranged such that only one possible relative orientation of the attachment part 104 and the base part 102 is possible. For instance may the additional protrusions 112 and the corresponding additional openings 112 be unevenly distributed around the periphery of the base part 102 and the attachment part 104 respectively. The additional protrusions 112 and the corresponding additional openings 112 may further be provided with a shape and/or orientation that only permits one relative orientation of the base part 102 and the attachment part 104.

Each additional opening 114 may further be provided with an elongated shape such that the additional protrusion 112 can move in relation to the additional opening 114. The additional opening 114 may for instance be provided with a semi-circular elongated shape, which allows the additional protrusion 112 to move therein as the attachment part 104 is rotated in relation to the base part 102. A first end of the additional opening 114 may by its interaction with the additional protrusion 112 define the secured relative position of the base part 102 and the attachment part 104, in which the fastener 30 is arranged in the second segment 110 of the keyhole-shaped opening 106. A second end of the additional opening 114 opposite the first end may by its interaction with the additional protrusion 112 define a released relative position of the base part 102 and the attachment part 104, in which the fastener 30 is arranged in the first segment 108 of the keyhole-shaped opening 106.

The device 10 may further be provided with an attachment part fastener 124 for securing the attachment part 104 to the base part 102. More than one attachment part fastener 124 is preferably provided.

The attachment part fasteners 124 may be resilient clips allowing snap-lock securing of the attachment part 104 to the base part 102. The attachment part fasteners 124 may further comprise fasteners such as a screw or similar.

The attachment part 104 is preferably releasably attached to the base part 102, whereby the attachment part fasteners 124 are releasable for instance by resiliently pressing the attachment part fasteners 124 out of snap-lock engagement.

Figure 3:
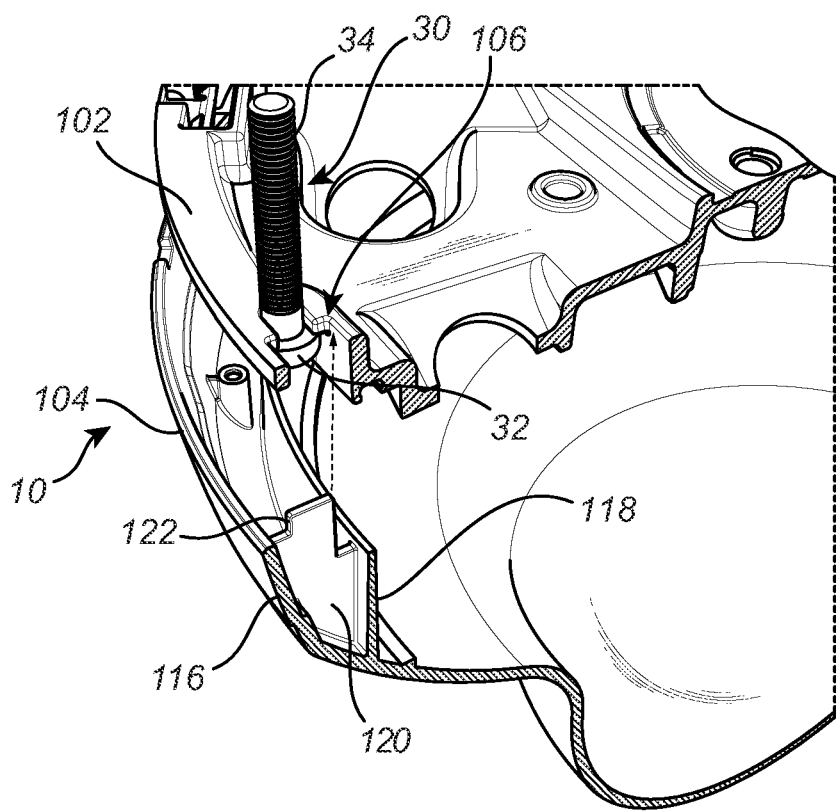
FIG. 3 discloses a detail view of the attachment part being attached to the base part.

FIG. 3 shows a detail view of how the protrusion 122 is arranged in the keyhole-shaped opening 106. The protrusion 122 is shown having a rectangular oblong cross-sectional shape, but is it to be realized that the protrusion can be provided with another cross-sectional shape as well such as circular, oval or square. The protrusion 122 may be provided with a shape corresponding to the shape of the first segment 108 of the keyhole-shaped opening 106, such that it can be arranged in the first segment 108.

The protrusion 122 may be configured to prevent attachment of the attachment part 104 to the base part 102 if the fastener 30 is not correctly arranged in the second segment 110 of the keyhole-shaped opening 106.

For instance, the protrusion 122 may be provided with a cross-sectional shape that occupies a sufficient amount of space in the first segment 108 of the keyhole-shaped opening 106 that the protrusion 122 cannot be inserted into or sufficiently close to the first segment 108 if either of the head 32 or the shaft 34 of the fastener 30 is arranged in the first segment 108.

The protrusion 122 is, when the attachment part 104 is attached to the base part 102, arranged such that the fastener 30 is prevented from movement into the first segment 108 of the keyhole-shaped opening 106.

This may be achieved by the protrusion 122 extending such that it is arranged sufficiently close to the keyhole-shaped opening 106 such that the head 32 of the fastener 30 will make contact with the protrusion 122 if relative movement is induced between the base part 102 and the fastener 30.

The protrusion 122 may alternatively extend into or to a proximal position above the first segment 108 of the keyhole-shaped opening 106, preferably near the transition between first segment 108 and second segment 110 thereof. Alternatively, in an embodiment where the second segment 110 has a sufficient elongated extension in the plane of the base part 102 to accommodate both the fastener 30 and the protrusion 122, the protrusion 122 can be arranged in the second segment 110 or in a proximal position above the second segment 110 in the assembled state of the device 10. The protrusion 122 should in such an embodiment be arranged between the fastener 30 and the first segment 108, such that the fastener 30 cannot move past the protrusion 122 in the second segment 110 to the first segment 108.

The protrusion 122 may further function as a guide for achieving correct alignment between the base part 102 and the attachment part 104.

Figure 4:
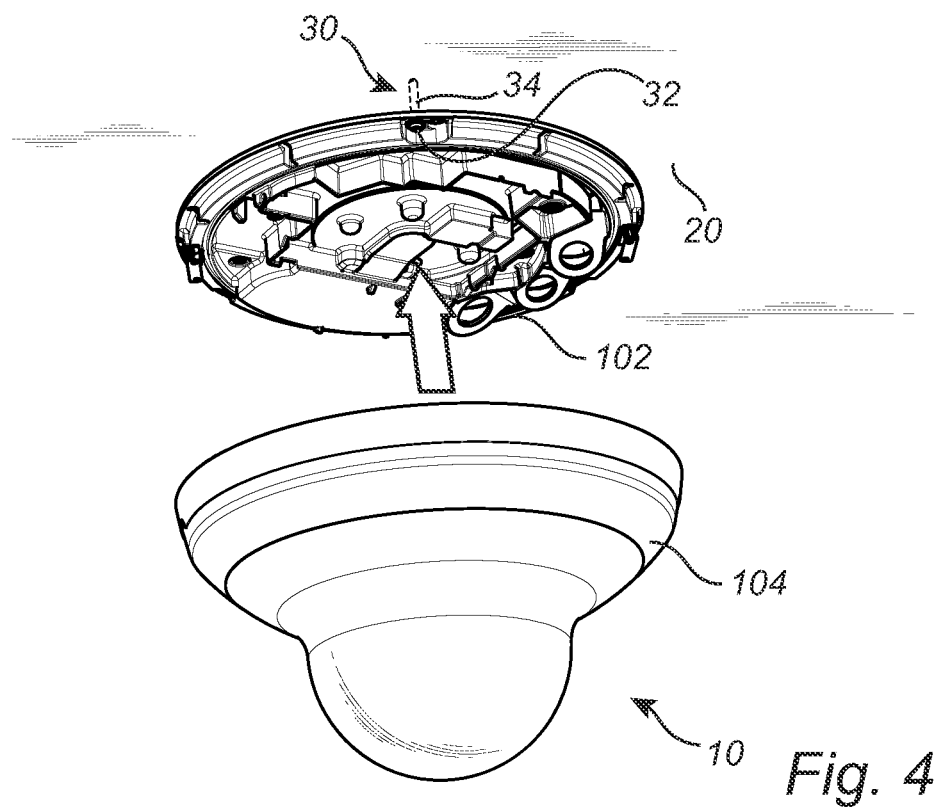
FIG. 4 discloses an attachment part being attached by linear movement relative the base part.

The attachment part 104 is illustrated in FIG. 3 and FIG. 4 as being attachable to the base part 102 by linear relative movement between the attachment part 104 and the base part 102. In other words, the attachment part 104 can be attached to the base part 102 by pushing the attachment part 104 together with the base part 102. The attachment part fasteners 124 may be configured to snap into a locking position once the attachment part 104 is correctly positioned in relation to the base part 102.

Figure 5:
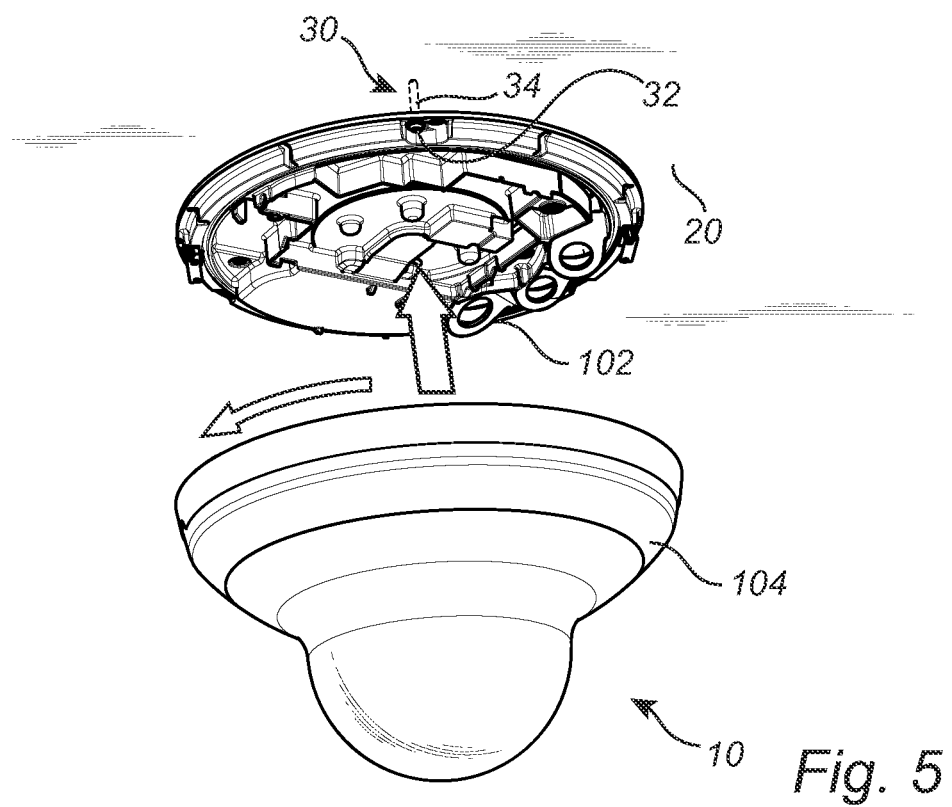
FIG. 5 discloses an attachment part being attached by linear and rotational movement relative the base part.

As illustrated in FIG. 5, the attachment part 104 may further in addition or as an alternative to the linear movement be configured to be attached to the base part 102 by means of a rotational relative movement between the attachment part 104 and the base part 102. The attachment part 104 may thus be arranged in connection with the base part 102, whereafter the attachment part 104 is twisted/rotated in relation to the base part 102 until the correct relative position is achieved. The attachment part fasteners 124 may be configured to snap into a locking position once the attachment part 104 is correctly positioned in relation to the base part 102.

As can be further seen in FIG. 3, the attachment part 104 may be provided with an outer annular bottom section 116, an inner annular bottom section 118 and a bridging section 120 connecting the outer annular bottom section 116 and the inner annular bottom section 118. The outer annular bottom section 116 and the inner annular bottom section 118 may be integrally formed with the attachment part 104. The outer annular bottom section 116 may be formed by the exterior of the attachment part 104, with the inner annular bottom section 118 forming an annular wall arranged interiorly of the outer annular section 116.

The bridging section 120 may be integrally formed with and provide rigidity to the outer and inner annular bottoms sections 116, 118. The outer and inner annular bottom sections 116, 118 forms between them an intermediate annular space into which the keyhole-shaped openings 106 along with the head 32 of the fastener 30 is arranged when the attachment part 104 is attached to the base part 102. The fastener 30 is thus hidden and cannot be removed without removing the attachment part 104 from the base part 102 first.

The bridging section 120 may further comprise a distal end 122 which forms the protrusion 122. The protrusion 122 is thus formed integrally with the bridging section 120 which is connected to the inner and outer annular bottom section 116, 118 respectively and may thus be provided with sufficient structural rigidity.

Figure 6:
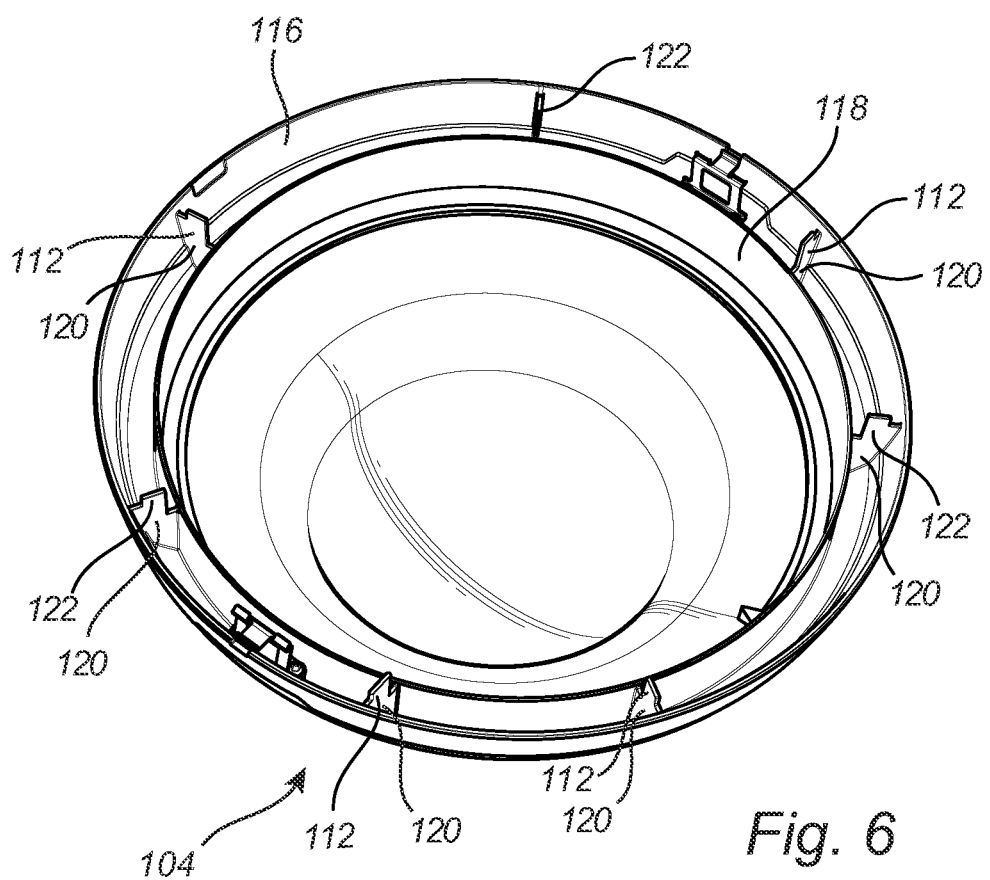
FIG. 6 discloses a perspective view of the attachment part.

Similarly, as is shown in FIG. 6 which shows the attachment part 104 in a perspective view, each additional protrusion 112 may be formed as a distal end 112 on a respective bridging section 120 between the inner and outer annular bottom sections 116, 118. The additional protrusion 112, as well as the protrusion 122, may thus be formed as a part of a strengthening bridging section 120 which provides structural rigidity to the attachment part 104.

It will be appreciated that the present concepts are not limited to the embodiments shown. Several modifications and variations are thus conceivable within the scope which thus is exclusively defined by the appended claims.

The invention claimed is:

1. A device configured for mounting to a surface, comprising
 a base part and
 an attachment part,
 the attachment part being attachable to the base part,
 wherein the base part is provided with one or more keyhole-shaped openings, each keyhole-shaped opening being configured for receiving a fastener comprising a head and a shaft for attaching the base part to the surface,
 each keyhole-shaped opening comprising a first segment permitting passage of the head and shaft and a second segment permitting passage of the shaft but preventing passage of the head,
 wherein the attachment part for each keyhole-shaped opening comprises a protrusion which in an assembled state of the base part and the attachment part restricts relative movement between the associated fastener and the base part,
 wherein the attachment part is attachable to the base part by linear relative movement between the attachment part and the base part and
 wherein the attachment part comprises an additional protrusion configured to be received by an additional non-keyhole-shaped opening provided in the base part in the assembled state.

2. The device according to claim 1, wherein the base part is a camera base part.

3. The device according to claim 1, wherein the attachment part is a dome window.

4. The device according to claim 1, wherein the keyhole-shaped opening and the protrusion are peripherally arranged on the base part and the attachment part respectively.

5. The device according to claim 1, wherein the attachment part is attachable to the base part by rotational relative movement between the attachment part and the base part.

6. The device according to claim 1, wherein the protrusion in the assembled state of the attachment part and the base part extends into the keyhole-shaped opening.

7. The device according to claim 1, wherein the base part comprises a plurality of keyhole-shaped openings.

8. The device according to claim 7, wherein the attachment part comprises a plurality of protrusions.

9. The device according to claim 7, wherein the keyhole-shaped openings are circumferentially distributed on the base part.

10. The device according to claim 1, wherein the attachment part comprises an outer annular bottom section, an inner annular bottom section and a bridging section connecting the outer annular bottom section and the inner annular bottom section, wherein the bridging section comprises a distal end forming the protrusion.

11. The device according to claim 1, wherein the attachment part is releasably attached to the base part.

* * * * *